United States Patent
Ma et al.

(10) Patent No.: US 9,716,822 B2
(45) Date of Patent: Jul. 25, 2017

(54) DIRECTION AWARE AUTOFOCUS

(71) Applicant: QUALCOMM Incorporated, San Diego, CA (US)

(72) Inventors: Lei Ma, San Diego, CA (US); Fan Deng, San Diego, CA (US); Leung Chun Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/693,604

(22) Filed: Apr. 22, 2015

(65) Prior Publication Data

US 2016/0142616 A1    May 19, 2016

Related U.S. Application Data

(60) Provisional application No. 62/080,157, filed on Nov. 14, 2014.

(51) Int. Cl.
*H04N 5/232* (2006.01)
*G02B 7/28* (2006.01)
*G06T 7/73* (2017.01)

(52) U.S. Cl.
CPC ........... *H04N 5/23212* (2013.01); *G02B 7/28* (2013.01); *G06T 7/74* (2017.01); *H04N 5/23216* (2013.01); *H04N 5/23219* (2013.01); *H04N 5/23293* (2013.01)

(58) Field of Classification Search
CPC .......... G03B 3/02; G03B 13/32; G03B 13/36; G03B 13/20; G02B 7/04; G02B 7/09; G02B 7/28; G02B 7/32

USPC ................................................... 348/345–352
See application file for complete search history.

(56) References Cited

U.S. PATENT DOCUMENTS

| 8,159,600 B2 * | 4/2012 | Tay ................... H04N 5/23212 348/345 |
| 8,237,771 B2 | 8/2012 | Kurtz et al. |
| 8,385,597 B2 | 2/2013 | Muramatsu |
| 8,411,195 B2 | 4/2013 | Li et al. |

(Continued)

FOREIGN PATENT DOCUMENTS

WO    WO-2013136815 A1    9/2013

OTHER PUBLICATIONS

International Search Report and Written Opinion—PCT/US2015/055328—ISA/EPO—Jan. 5, 2016.

*Primary Examiner* — Kelly L Jerabek
(74) *Attorney, Agent, or Firm* — Knobbe, Martens, Olson & Bear, LLP

(57) ABSTRACT

Methods and imaging devices are disclosed for determining a first direction to move a lens in an autofocus operation. For example, one method includes capturing a plurality of frames depicting a scene, selecting a portion of at least one frame that corresponds to an object in a displayed frame, and tracking the object in the plurality of frames, where tracking the object provides a reference parameter of the object for each of the plurality of frames. The method may further includes detecting a change in the reference parameter of at least a first frame and a second frame of the plurality of frames, determining a focus direction based on the change in the reference parameter, and initiating a focus operation by moving a lens of the imaging device based on the determined focus direction.

28 Claims, 8 Drawing Sheets

(56) References Cited

U.S. PATENT DOCUMENTS

| | | | |
|---|---|---|---|
| 8,457,431 B2* | 6/2013 | Tay | G02B 7/36 |
| | | | 348/345 |
| 2008/0107411 A1 | 5/2008 | Hope | |
| 2009/0009651 A1* | 1/2009 | Takayanagi | G03B 13/36 |
| | | | 348/345 |
| 2009/0256953 A1* | 10/2009 | Yasuda | G03B 13/32 |
| | | | 348/349 |
| 2012/0033127 A1* | 2/2012 | Uenishi | H04N 5/23293 |
| | | | 348/345 |
| 2012/0218406 A1* | 8/2012 | Hanina | G06F 3/017 |
| | | | 348/143 |
| 2013/0093939 A1* | 4/2013 | Takanashi | G02B 7/36 |
| | | | 348/345 |
| 2013/0162839 A1 | 6/2013 | Yoneyama et al. | |
| 2013/0300917 A1 | 11/2013 | Yata | |
| 2014/0341553 A1* | 11/2014 | Kikuchi | G02B 7/282 |
| | | | 396/81 |
| 2014/0375872 A1 | 12/2014 | Honjo et al. | |

* cited by examiner

DIRECTION AWARE AUTOFOCUS

CROSS-REFERENCE TO RELATED APPLICATIONS

This application claims the benefit of U.S. Provisional Patent Application No. 62/080,157 filed Nov. 14, 2014, entitled "DIRECTION AWARE AUTO FOCUS" and assigned to the assignee hereof. The disclosure of this prior application is considered part of, and is incorporated by reference in, this disclosure.

TECHNICAL FIELD

The present embodiments relate to imaging devices, and in particular, to methods and apparatus for automatic focusing of imaging devices.

BACKGROUND

The integration of digital processing technology with imaging devices has enabled more powerful and easier to use photographic products. For example, the ability to digitally control the shutter speed of an imaging device, aperture, and sensor sensitivity has provided for improved picture quality in a variety of imaging environments without the need for a photographer to manually determine and set these parameters for each environment.

Imaging devices having an automatic focusing capability (imaging devices and methods of which may be referred to herein simply as "autofocus") has also made capturing high quality photographs easier by enabling almost any photographer, regardless of skill, to obtain a clear image in most imaging environments. Autofocus may have also reduced the workload of professional photographers. This may enable the photographers to focus more of their energies on the creative aspects of their trade, with a corresponding increase in the quality of photographs produced by these photographers.

Existing autofocus search operations may result in several problems. For example, the search time for the optimal lens position may be longer due to the imaging device having to search in both directions, near and far, thus resulting in delay before a properly focused image may be captured. Because of this the rate of failed autofocusing may increase and the user may have an undesired experience because of defocusing at the beginning of the autofocus search operation instead of receiving a progressively sharper focus. As a result, during an autofocus search operation the user may view an image that is slightly out of focus, the autofocus search operation may then cause the image to be increasingly defocused while the imaging device searches in the incorrect direction, and finally the imaging device may search in the opposite direction to locate the optimal focus position. There remains a need to remove this effect and minimize the time needed during an autofocus search operation.

SUMMARY

The systems, methods, and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein, including the summary described below.

Some embodiments may include a method of focusing an imaging device by determining which direction to first move a lens of the imaging device in order to obtain a quicker and sharper focus. This method may include capturing multiple frames depicting a scene with an imaging device and selecting a portion of at least one frame that corresponds to an object in a displayed frame. In some embodiments, the selecting a portion of at least one frame that corresponds to an object can include displaying at least one of the multiple frames and receiving a user input to select a portion of the displayed frame that corresponds to an object in the displayed frame. The method also includes tracking the object in the multiple frames, where tracking the object provides a reference parameter of the object for each of the multiple frames. The method further includes detecting a change in the reference parameter of at least a first frame and a second frame of the multiple frames, and determining a focus direction based on the change in the reference parameter. The method also includes initiating a focus operation by moving a lens of the imaging device based on the determined focus direction.

In some embodiments, the reference parameter can correspond to the size of the object relative to a frame in which it is depicted. In this regard, the tracking of the object in the multiple frames can include detecting a size of the object in the first frame, and detecting a size of the object in the second frame, where the second frame is one of the multiple frames captured after capturing the first frame. In some embodiments, the change in the reference parameter can be a difference between the size of the object in the first frame and the size of the object in the second frame.

In other embodiments, the method can include determining a bounding rectangle that surrounds the object for each depiction of the object in the multiple frames. In these embodiments, the reference parameter for each frame can be based on a dimension of the bounding rectangle. In some embodiments, the reference parameter for each frame can be based on one of an x-dimension of the bounding box, a y-dimension of the bounding rectangle, or a diagonal of the bounding rectangle.

In some embodiments, the method can be performed following a completed autofocus search operation. In these embodiments, after the completion of the prior autofocus search operation, the detecting a change in the reference parameter can include identifying a last frame of the multiple frames from the prior focus operation and determining a reference parameter of the last frame from the prior autofocus search operation. The method also can include setting the reference parameter of the first frame for a current autofocus search operation to be the reference parameter of the last frame from the prior autofocus search operation.

In another embodiment, the detecting a change in the reference parameter can include comparing the reference parameter of the first frame with the reference parameter of each frame captured after the first frame to generate a set of reference parameter changes. The set of reference parameter changes can then be adjusted. In one embodiment, adjusting the set of reference parameter changes comprises smoothing the set of reference parameter changes. In still another embodiment, smoothing the set of reference parameter changes can include applying a filter to the set of reference parameter changes, and the filter can be configured to reduce noise in the set of reference parameter changes between the first frame and each subsequent frame for the multiple frames.

In some embodiments, the method may include generating a reference parameter change indicator indicative of a trend of the difference between the reference parameter of the first frame and each frame captured after the first frame. In one embodiment, the reference parameter change indicator can indicate the object is getting closer to the imaging device when the trend of the difference between the reference parameter of each frame increases relative to the reference parameter of the first frame. In another embodiment, the reference parameter change indicator can indicate the object is getting farther away from the imaging device when the trend of the difference between the reference parameter of each frame decreases relative to the reference parameter of the first frame.

In one embodiment, the determining of the focus direction can include determining a threshold having a first boundary value and a second boundary value. The change in the reference parameter may be compared with the first boundary value and the second boundary value, and the focus direction can be determined only when the change in the reference parameter is greater than the first boundary value of the threshold or less than the second boundary value of the threshold. In some embodiments, the first and second boundary values can correspond to the position of the object relative to the imaging device. In another embodiment, the first and second boundary values can be dynamic and configured to be adjusted for separate focusing operations. In some embodiments, the focus direction can be determined to be closer when the change in the reference parameter of each frame increases relative to the reference parameter of the first frame and the change in the reference parameter is greater than the first boundary value of the threshold. The focus operation may be initiated by moving the lens away from the object when the focus direction is determined to be closer. In other embodiments, the focus direction can be determined to be further away when the change in the reference parameter of each frame decreases relative to the reference parameter of the first frame and the change in the reference parameter is less than the second boundary value of the threshold. The focus operation can be initiated by moving the lens toward the object when the focus direction is determined as further away. In some embodiments, the first boundary value can correspond to an upper boundary value of the threshold and the second boundary value can correspond to a lower boundary value of the threshold.

According to another aspect, an apparatus for determining a direction of focusing an imaging device is disclosed. The apparatus includes a lens, an image sensor configured to capture multiple frames depicting a scene, a processor operably coupled to the image sensor and lens, and a memory, operably coupled to the processor. The memory is configured to store an input processing module, an object tracking module, a reference parameter determination module, a change determination module, and an autofocus control module. The input processing module is configured to select a portion of at least one frame that corresponds to an object. The object tracking module is configured to track the object in the multiple frames.

The reference parameter determination module is configured to determine a reference parameter of the object for each of the multiple frames based on the tracking of the multiple frames. In some embodiments, the reference parameter determination module can be further configured to determine a region of interest that surrounds the object for each depiction of the object in the multiple frames, where the reference parameter for each frame is based on at least one dimension of the region of interest. In another embodiment, the reference parameter determination module can be further configured to, after the completion of a prior focus operation, identify a last frame of the multiple frames from the prior operation, determine a reference parameter of the last frame from the prior focus operation, and set the reference parameter of the first frame for a current focus operation to be the reference parameter of the last frame from the prior focus operation.

The change determination module is configured detect a change in the reference parameter of at least a first frame and a second frame of the multiple frames. In some embodiments, the change in the reference parameter can be a difference between the reference parameter of the first and second frames. In other embodiments, the change determination module can be further configured to generate a set of reference parameter changes including multiple changes in the reference parameter between the reference parameter of the first frame and the reference parameter each frame captured after the first frame. The change determination module can be further configured to adjust the set of reference parameters changes to smooth the set of reference parameter changes, and generate a parameter change indicator indicative of a trend of the difference between the reference parameter of the first frame and each frame captured after the first frame. In some embodiments, parameter change indicator can indicate that the object is getting closer to the imaging device when the trend of the difference between the reference parameter of each frame increases relative to the reference parameter of the first frame. In other embodiments, parameter change indicator can indicate that the object is getting farther away from the imaging device when the trend of the difference between the reference parameter of each frame decreases relative to the reference parameter of the first frame.

In some embodiments, the memory can be further configured to store a threshold determination module. The threshold determination module can be configured to determine a threshold having first and second boundary values based on the position of the object relative to the imaging device, and configured to compare the change in the reference parameter with the first boundary value and second boundary value.

The autofocus control module is configured to determine a focus direction based on the change in the reference parameter and initiate a focus operation by moving the lens based on the focus direction. In some embodiments, the autofocus control module is configured to determine the focus direction only when the change in the reference parameter is greater than the first boundary value or less than the second boundary value.

According to another aspect, an apparatus for determining a direction of focusing an imaging device is disclosed. The apparatus includes a means for capturing multiple frames depicting a scene, a means for selecting a portion of at least one frame that corresponds to an object, and a means for tracking the object in the multiple frames. The apparatus also includes a means for determining a reference parameter of the object for each of the multiple frames based on the tracking of the multiple frames, and a means for detecting a change in the reference parameter of at least a first frame and a second frame of the multiple frames. The apparatus further includes a means determining a focus direction based on the change in the reference parameter and a means for initiating a focus operation by moving the lens based on the focus direction.

According to another aspect, a non-transitory computer readable medium having instructions stored thereon that when executed cause a processor to perform a method of initiating a focus operation is disclosed. The method performed by the executed code includes capturing multiple frames depicting a scene with an imaging device and selecting a portion of at least one frames that corresponds to an object in a displayed frame. The method also includes tracking the object in multiple frames, where tracking the object provides a reference parameter of the object for each of the multiple frames, and detecting a change in the reference parameter of at least a first frame and a second frame of the plurality of frames. The method further includes determining a focus direction based on the change in the reference parameter and initiating a focus operation by moving a lens of the imaging device based on the focus direction.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION OF CERTAIN ILLUSTRATIVE EMBODIMENTS

Figure 1:
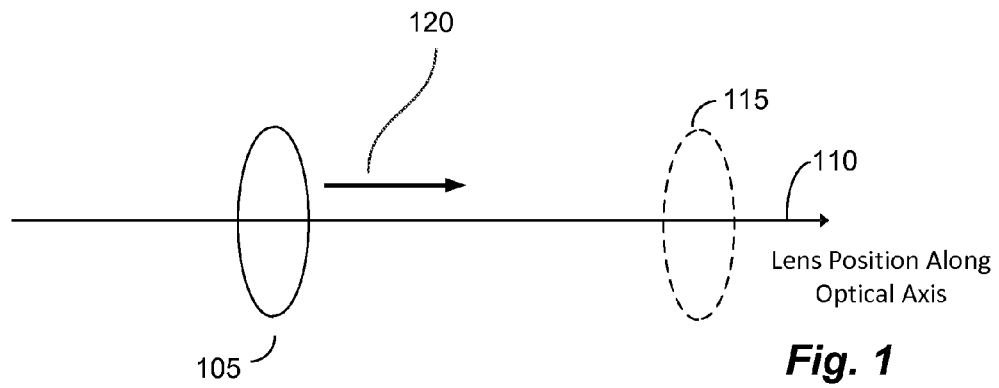
FIG. 1 illustrates an example where an imaging device initiates an autofocus search operation in the correct direction.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Autofocusing may be performed in an image device by a variety of types of actuators. Cameras focus scenes onto image sensors with lenses that move within a movable range to enable focusing. Autofocus imaging devices move the lens using voice coil motors (VCM), piezo, or MEMS solutions.

A variety of autofocus ("AF") methods may be used in modern digital imaging devices to determine the direction and how far the mechanical movement will move the lens. For example, because images with higher contrast may tend to have a sharper focus, some autofocus methods seek a focus position that provides an image with the highest contrast. This may be known as a focus value algorithm, where focus values at different lens positions are compared to determine which image has the highest contrast. Another example of an autofocus method is based on object depth estimation, where the algorithm directly moves a lens to an estimated position based on the estimated depth or location of the target object from the imaging device. Based on the confidence in the estimation, minimal contrast based autofocusing may be used. However, when the optimal lens position, or optimal focus position, for an optimal focus is not known the imaging device uses the contrast based, or focus value, autofocus method. The optimal lens position refers to the lens position which results in maximum focus value or highest contrast value.

Some implementations of the focus value method may start with an unknown optimal lens position of the target object to be focused. To start the autofocus, the algorithm first search for the optimal lens position. The search begins by selecting a direction to move the lens to obtain successive samples. The algorithm takes the successive samples, compares the samples, and determines the focus position direction based on the sample with the higher contrast.

The decision as to which direction to start a search is a difficult decision because at the outset of an autofocus search operation there is a lack of knowledge of the optimal focus position for a target object. In some embodiments, the direction decision is based, in part, on current lens position and a pre-defined boundary. A pre-defined boundary can be a range of locations of an object relative to the imaging device. The boundaries may range between distances that are near to an imaging device and infinity. It should be realized that the pre-defined boundaries can vary for different imaging devices. Commonly, the near position is about 10 centimeters from the camera and the infinity position is about 200 centimeters or more from the camera. As a result of this decision and the lack of knowledge of the actual optimal lens position, the overall success rate of selecting the correct direction to move the lens is approximately 50%.

Some autofocus methods may suffer from an inability to achieve adequate focus in certain imaging environments. For example, imaging environments that present multiple objects within an image at different distances from the image sensor may make it difficult for an autofocus method to determine which object or objects of the multiple objects should be selected for focus. Other imaging environments may include objects in motion. Objects in motion may not be recognized by traditional autofocus methods. This may result in an inferior focus when compared to the methods disclosed herein.

Embodiments described herein include methods, apparatus, and computer readable media that are configured to determine the first direction to move a lens in an autofocus search operation of an imaging device. In some embodiments, the method may be directed to a method and image capture device that can determine an initial focus direction to move a lens at the start of an AF operation. By determining the focus direction, the lens of an imaging device can be moved in an appropriate direction that provides for a sharper focus of the object. This may result in potential improvements in AF speed and overall accuracy, thereby improving image quality in the image capture device. Accordingly, one embodiment introduces a software solution to determine a focus direction during the initialization of an AF operation.

In some embodiments of the methods and apparatus, the focus direction may be based on a change in a reference parameter. In such an implementation, an imaging device may be configured to capture multiple images or frames of a selected object. The object can then be tracked, via a tracking module of the imaging device, through the multiple frames to provide tracking data. Tracking modules may include technologies such as package tracking, laser tracking, and the like. For example, the tracking module may implement Touch-to-Track® developed by Qualcomm Technologies, Inc. The method and apparatus uses the tracking information to monitor a change in a reference parameter of the object. For example, the reference parameter of the object is tracked in the multiple frames and may be compared to a previous reference parameter to determine whether the reference parameter has changed among the multiple frames. The reference parameter can be related to the size of the object, whereby the size of the object may change between successive frames. In one implementation, an increase in the size of the object may indicate the object is getting closer to the imaging device. The imaging device can be configured to extract the focus direction based on the change in the reference parameter. For example, when the object is determined to be getting closer to the imaging device, the focus direction can be determined to cause the actuator of the imaging device to move the lens away from the object, thereby providing a sharper focus. Additionally, when the object is determined to be moving farther away from the imaging device, the focus direction can be determined to cause the actuator of the imaging device to move the lens toward the object, thereby providing a sharper focus.

In some embodiments, a movement direction estimation may be extracted or derived based on the change in the reference parameter. For example, the imaging device may be able to estimate the direction of movement of each object in the scene. The movement of the object may be either near, e.g., closer to the imaging device, or far, e.g., further away from the imaging device. The estimated direction of the movement may be provided to the autofocus imaging device, and, based on the direction of movement relative to the imaging device, the imaging device can determine the proper direction to move the lens as part of the autofocus process. The imaging device may be able to decrease the time for searching for the optimal lens position to focus on the selected object because only lens positions in one direction will be searched. The imaging device will avoid having to double back if the incorrect determination was made initially. The imaging device may utilize the movement direction of the selected object to optimize the user experience, search speed, and success rate of the autofocus imaging device.

In some embodiments, the movement direction estimation of the selected object can be extracted from the tracking the of the reference parameter. In one implementation, object tracking may return information related to a reference parameter which may include an indication of a change in the object size or a change in the reference parameter. In one implementation, the size may be based on relative reference parameter information between successive images. An individual size determination may be less dependable, thus the imaging device may use an overall reference parameter change trend to establish a more credible determination of how the reference parameter of an object is changing. The imaging device may apply a median filter to the tracked reference parameter to output a dependable change trend, where the tracking information may include a bounded box representing the tracked object. In one implementation, a median filter may be a filter able to perform noise reduction on an image or signal, where the signal of one entry corresponding to a single frame is replaced with the median of neighboring entries. In one implementation, a one dimensional median filter having a length of 5 may be used on the width of the tracking information to prevent noise, such that the median filter may replace the instant entry with the median of the five neighboring entries. In some embodiments, the neighboring entries include the entries preceding the instant entry. In other embodiments, the neighboring entries include the entries following the instant entry. In yet other embodiments, the neighboring entries include entries that both follow and precede the instant entry. The reference parameter change trend may indicate the average or overall direction of movement of the object. The method and apparatus may then determine the direction to move a lens to initiate an autofocus search operation based on the determined direction of movement, as described above. Such a method may enable significantly faster and smooth focusing of the tracked object, as compared to methods that use the focus value method to determine the start direction of an autofocus search operation.

In some embodiments of the methods and apparatus, a dynamic threshold for deciding the movement direction may be provided. The reference parameter information may be mapped to a physical distance of the selected object. From this, the decision of which direction to move the lens may be based on a determination of where the object is physically positioned as derived from the reference parameter. The direction decision may be less sensitive when the object is physically positioned farther away or at a distance from the image device. The direction decision may be more sensitive when the object is physically positioned closer or near to the image device.

In one implementation, the selected object being tracked for direction information may be viewable on the display of an imaging device in a preview mode. The display of the imaging device may provide a preview of the selected object for a user of the image device to align the preferred image. For example, a display of the imaging device may depict frames of the entire scene prior to the autofocus search operation, and a second window within the display (e.g., picture-in-picture window) may be provided for previewing the tracked object. During this preview stage, the imaging device may begin tracking the object to acquire a change in the reference parameter from which the imaging device may derive the focus direction information.

In another implementation, an autofocus search operation may progressively improve to a sharper focus from the beginning of an autofocus search operation. In this way, the imaging device may search for the optimal lens position through larger steps and progressively step to the optimal lens position during later movements. The larger steps may provide greater contrast values between each successive step, thereby limiting instances of wrong direction autofocus search operations.

FIG. 1 illustrates an example of an embodiment where an imaging device initiates an autofocus search operation in the correct direction. The imaging device includes a lens 105 having a first and/or starting. In the autofocus search operation shown in FIG. 1, the user of the imaging device may wish to capture an image of a scene or object (not shown) having an optimal lens position 115. In the situation illustrated in FIG. 1, the imaging device begins the autofocus search operation by moving the lens 105 in starting direction 120 along the optical axis 110 of the imaging device, which is toward the optimal lens position 115.

Figure 2A:
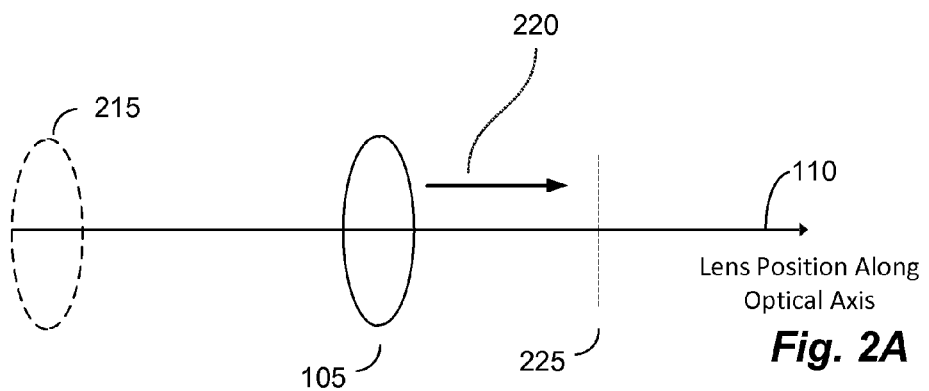
FIG. 2A illustrates an example where an imaging device imitates an autofocus search operation in an incorrect direction.

FIG. 2A illustrates another example of an embodiment where an imaging device initiates an autofocus search operation in an incorrect direction. FIG. 2A is similar to FIG. 1 in that the lens 105 has a starting position and is moved a starting direction 220 along the optical axis 110. However, FIG. 2A includes an optimal lens position 215 located in the opposite direction of starting direction 220. In this situation, the lens 105 is first moved in starting direction 220, away from the optimal lens position 215. The imaging device moves the lens 105 until it reaches direction-detection boundary 225, at which point the imaging device determines starting direction 220 was incorrect. Upon determining starting direction 220 was incorrect, the imaging device moves lens 105 back toward the starting position, and also toward the optimal lens position 215. Thus, the imaging device not only had to move the original incorrect direction 220, the imaging device must move the lens 105 over that same distance a second time to return to the starting position, and then cover the necessary distance to reach the optimal lens position 215. The result is that autofocus search operation takes a greater amount of time to perform because it has additional and unneeded movements, and the user of the imaging device experiences a defocused image during the incorrect movement away from the optimal lens position 215.

Figure 2B:
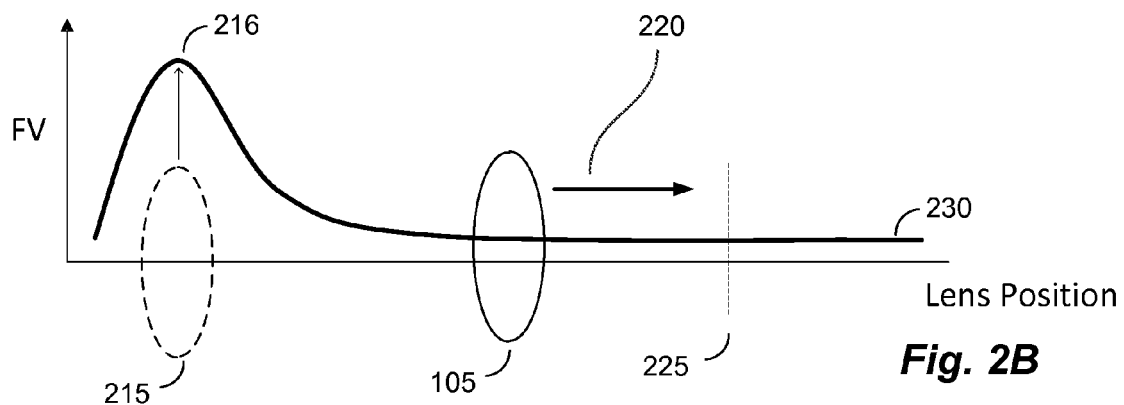
FIG. 2B depicts a graphical representation of the autofocus search operation FIG. 2A.

FIG. 2B depicts the autofocus search operation of FIG. 2A. FIG. 2B illustrates an approach similar to FIG. 2A. FIG. 2B graphically illustrates the focus value as a function of lens position, illustrated as curve 230. The focus value may be an image contrast measurement, where a sharper focus is represented by a higher contrast. Thus, optimal lens position 215 is shown where the highest focus value 216 is present. Similar to FIG. 2A, the starting lens position of lens 105 is located on the tail of the curve 230 of FIG. 2B. When the imaging device moves the lens in the incorrect starting direction 220, the focus value of each successive image is essentially the same thus the imaging device is unable to determine in which direction the optimal focus is located. Typical focus values like this might cause the imaging device to fail because the focus values of the defocused image are substantially similar between each lens position. The imaging device has no confidence in the comparison of the focus value between each lens position to determine whether the imaging device should reverse the direction of moving the lens. The imaging device is unable to determine which direction to move the lens from a comparison of focus values between the lens positions surrounding the current lens position. Thus, the imaging device may continue to move the lens in the incorrect direction, e.g., direction 220, indefinitely because of the similarity in focus values of surrounding lens positions. To correct for continued lens movement in the incorrect direction, the imaging device may employ a direction decision boundary 225, as described above, at which point the imaging device may be caused move the lens back over the original distance back toward the starting position.

Figure 3:
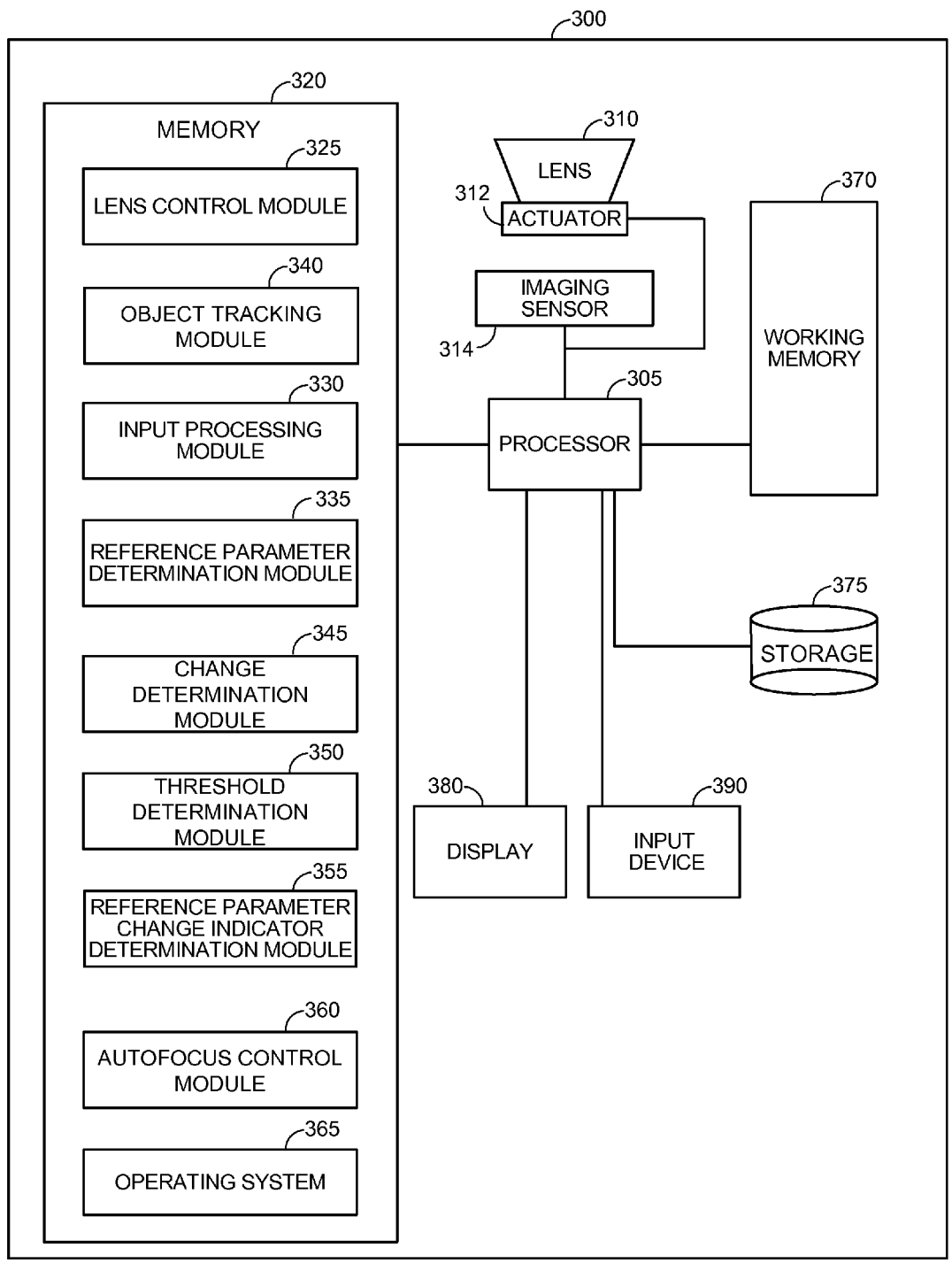
FIG. 3 is a block diagram of an imaging device including an autofocus control module.

FIG. 3 is an example of a block diagram illustrating an embodiment of an imaging device 300 that includes an autofocus control functionality. The imaging device 300 includes a processor 305 operatively connected to an image sensor 314, lens 310, actuator 312, working memory 370, storage 375, display 380, and an input device 390. In addition, processor 305 is connected to a memory 320. The memory 320 stores several modules that store data values defining instructions to configure processor 305 to perform functions of imaging device 300. The memory 320 includes a lens control module 325, an object tracking module 340, and an autofocus control module 360, and an operating system 365. The imaging device 300 also includes an input processing module 330, a reference parameter determination module 335, a change determination module 345, a threshold determination module 350, and a reference parameter change indicator determination module 355. While FIG. 3 illustrates numerous modules independent of object tracking module 340, it will be understood that any of the modules shown may be included as sub-modules, either individually or in combination, of the object tracking module 340.

In an illustrative embodiment, light enters the lens 310 and is focused on the image sensor 314. In one aspect, the image sensor 314 utilizes a charge coupled device. In another aspect, the image sensor 314 utilizes either a CMOS or CCD sensor. The lens 310 is coupled to the actuator 312, and is moved by the actuator 312. The actuator 312 is configured to move the lens 310 in a series of one or move lens movements during an autofocus search operation. When the lens 310 reaches a boundary of its movement range, the lens 310 or actuator 312 may be referred to as saturated. The lens 310 may be actuated by any of a variety of methods and components, including a voice coil motor (VCM), Micro-Electronic Mechanical System (MEMS), or a shape memory alloy (SMA).

The display 380 illustrated in the embodiment of FIG. 3 is configured to display images and frames captured via lens 310 and may also be utilized to implement configuration functions of device 300. In one implementation, display 380 can be configured to display one or more objects selected by a user, via an input device 390, of the imaging device.

The input device 390 may take on many forms depending on the implementation. In some implementations, the input device 390 may be integrated with the display 380 so as to form a touch screen display. In other implementations, the input device 390 may include separate keys or buttons on the imaging device 300. These keys or buttons may provide input for navigation of a menu that is displayed on the display 380. In other implementations, the input device 390 may be an input port. For example, the input device 390 may provide for operative coupling of another device to the imaging device 300. The imaging device 300 may then receive input from an attached keyboard or mouse via the input device 390.

Still referring to the embodiment of FIG. 3, the working memory 370 may be utilized by the processor 305 to store data dynamically created during operation of the imaging device 300. For example, instructions from any of the modules stored in the memory 320 (discussed below) may be stored in working memory 370 when executed by the processor 305. The working memory 370 may also store dynamic run time data, such as stack or heap data utilized by programs executing on processor 305. The storage 375 may be utilized to store data created by imaging device 300. For example, images captured via lens 310 may be stored on storage 375.

Figure 7:
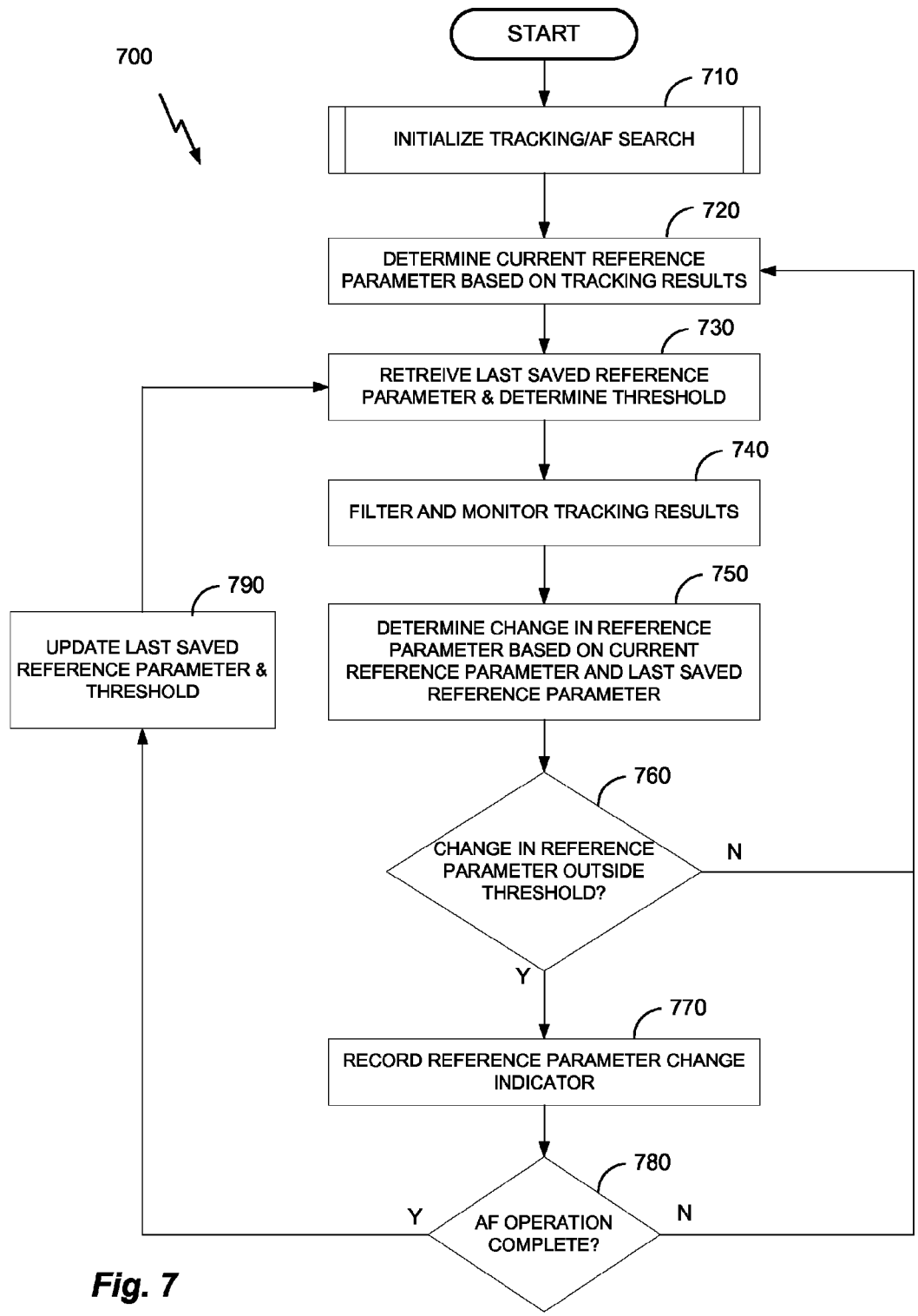
FIG. 7 is a flowchart of a process of determining a direction of an autofocus search operation in accordance with one embodiment.

The memory 320 may be considered a computer readable media and stores several modules. The modules store data values defining instructions for processor 305. These instructions configure the processor 305 to perform functions of device 300. For example, in some aspects, memory 320 may be configured to store instructions that cause the processor 305 to perform process 700, or portions thereof, as described below and as illustrated in FIG. 7. In the illustrated embodiment, the memory 320 includes a lens control module 325, an object tracking module 340, and an autofocus control module 360, and an operating system 365. The memory 320 may further include an input processing module 330, a reference parameter determination module 335, a change determination module 345, a threshold determination module 350, and a reference parameter change indicator determination module 355.

The operating system 365 includes instructions that configure the processor 305 to manage the hardware and software resources of the device 300.

The lens control module 325 illustrated in the embodiment of FIG. 3 includes instructions that configure the processor 305 to control the lens 310. Instructions in the lens control module 325 may configure the processor 305 to effect a lens position for lens 310. In some aspects, instructions in the lens control module 325 may configure the processor 305 to control the lens 310, in conjunction with image sensor 314 to capture an image. Therefore, instructions in the lens control module 325 may represent one means for capturing an image with an image sensor 314 and lens 310.

The input processing module 330 includes instructions that configure the processor 305 to read input data from the input device 390. In one aspect, input processing module 330 may configure the processor 305 to detect objects within an image frame captured by the image sensor 314. In another aspect, input processing module 330 may configure processor 305 to receive a user input from input device 390 and identify a user selection or configuration based on the user manipulation of input device 390. Therefore, instructions in the input processing module 330 may represent one means for identifying or selecting one or more objects within an image frame.

Instructions in the reference parameter determination module 335 may configure the processor 305 to determine the reference parameter based on, at least in part, the user selected object. In some aspects, the reference parameter may be based on a measurable feature of the object. For example, the reference parameter may be related to the objects size relative to the frame of the captured image. In another example, the reference parameter may be related to a bounded box configured to encompass the selected object, whereby at least one of the dimensions of the bounded box defines a reference parameter. Therefore, instructions in the reference parameter determination module 335 may represent one means for determining a reference parameter based on, at least in part, a user selected object.

Instructions in the object tracking module 340 may configure the processor 305 to provide object tracking capability. In some embodiments, the object may be tracked as it moves around display 380. As the object moves around display 380, the reference parameter determination module 335 may continually determine a reference parameter for each frame of the tracked image. In some embodiments, tracking imaging devices are integrated with the present disclosure. For example, U.S. Pat. No. 8,483,437, the contents of which are incorporated herein in their entirety, discloses features for tracking objects in images using training images; U.S. Patent Application Pub. No. 2013/0258141, the contents of which are incorporated herein in their entirety, discloses features for detecting and tracking an object in video frames and rejecting false positives; U.S. Patent Application Pub. No. 2014/0205141, the contents of which are incorporated herein in their entirety, discloses features for tracking an object in video frames to generate a tacking result; and U.S. Pat. No. 8,249,299, the contents of which are incorporated herein in their entirety, discloses features for identifying and tracking objects in a video.

In some aspects, object tracking module 340 may configure the processor 305 to receive object tracking data including at least information related to the reference parameter between successive image frames of the tracked object. Therefore, instructions in the object tracking module 340 represents one means for tracking a user selected object.

Instructions in the change determination module 345 may configure the processor 305 to determine a change in the reference parameter based on, at least in part, a current reference parameter and a last saved reference parameter (described below). For example, the change determination module 345 may include instructions to estimate the change in the reference parameter based on one or more images captured by image sensor 314. The processor 305 may be configured to compare a previous reference parameter and a current reference parameter from reference parameter determination module 335 and utilize instructions in change determination module 345 to determine a change in the reference parameter. Therefore, instructions in the change determination module 345 represent one means for determining a change in the reference parameter.

In some aspects, the change determination module 345 may be configured by the processor 305 to determine a set of reference parameter changes, based, at least in part, on the changes in the reference parameter over successive image frames during an autofocus search operation. For example, change determination module 345 may include instructions to configure the processor 305 to determine a change between the last saved reference parameter and each reference parameter of successively tracked image frames. Therefore, instructions in the change determination module 345 may represent one means for generating a set of reference parameter changes.

Instructions in the threshold determination module 350 may configure the processor 305 to determine a threshold value based, at least in part, on the distance of the object from the imaging device. For example, the object distance may be based on a physical distance between the object and the lens of the imaging device, and the threshold value may correlate to a given object distance. The object distance may be a function of the position of the lens, whereby the imaging device having a lens position from the lens control module 325 can determine the object distance. For example, lens position maybe determined by the characteristics intrinsic to the imaging device, such as, based on the actuator position. In one embodiment, the threshold value is dynamic and can be updated for each autofocus search operation based on the distance of the object.

In another embodiment, the threshold value can include a first and second boundary value. For example, the threshold may represent a percentage of change in the reference parameter, whereby the imaging device can confidently determine that the reference parameter is changing and the detected change is not an outlier or extraneous data point. For example, the threshold determination module 350 may configure the processor 305 to determine a threshold value having a first and second boundary value. The processor 305 may receive the threshold value, and then may be configured by the threshold determination module 350 to evaluate whether the percentage change in the reference parameter, either increase or decrease, is outside of first and/or second boundary value. For example, if the threshold value is determined to be 0.15 or a 15% change, based on the object distance, then the first or upper boundary would be a 15% increase in the reference parameter and the second or lower boundary would be 15% decrease in the reference parameter. The autofocus control module 360 would then configure the processor 305 to determine an autofocus search operation direction only when the reference parameter is changed by 15%. Therefore, instructions in the threshold determination module 350 may represent one means for determining a threshold value having a first and second boundary.

In one aspect, instructions in the reference parameter change indicator determination module 355 may configure processor 305 to receive a set of reference parameter changes and determine a reference parameter change indicator. In one embodiment, the reference parameter change indicator is a trend in the reference parameter changes, which represents the average change in the reference parameter between the multiple image frames. For example, a set of reference parameter changes may be generated by the processor 305 as configured by the reference parameter determination module 335. However, the set of reference changes may include every data point of the reference parameter between successive images, such that the majority of data points indicate a decrease in the reference parameter but the set includes outliers indicating an increase in the reference parameter. In one embodiment, instructions in the reference parameter change indicator determination module 355 may configure the processor 305 to completely remove or ignore the outliers. In another embodiment, the processor 305 may be configured to apply a filter (e.g., a median filter) to smooth the data set to determine an average or trend in the changes of the reference parameter between successive images. Therefore, instructions in the reference parameter change indicator determination module 355 may represent one means for determining a trend or estimation of the change in the reference parameter.

The autofocus control module 360 includes instructions that configure processor 305 to autofocus the lens 310. Instructions in the autofocus control module 360 may configure processor 305 to effect a lens position for lens 310. In an embodiment, the instructions in the autofocus control module 360 may send the lens position information, along with other input parameters, to the lens control module 325.

The lens position information may include a current lens position, a target lens position, and an autofocus search operation direction determination based, at least in part, on the results from change determination module 345 and/or reference parameter change indicator determination module 355. In some aspects, instructions in the autofocus control module 360 may represent one means for initializing an autofocus search operation. In some aspects, instructions in the autofocus control module 360 may represent one means for determining a magnitude and/or direction of lens movement for an autofocus search operation based, at least in part, on a change in the reference parameter.

Figure 4A:
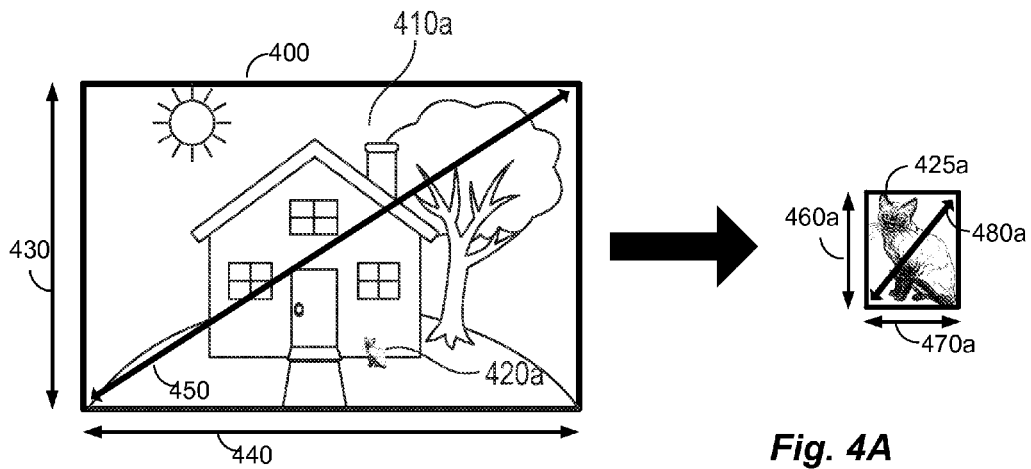
FIGS. 4A-4C illustrate a change in at least one reference parameter of a selected object in accordance with one embodiment.
Figure 4B:
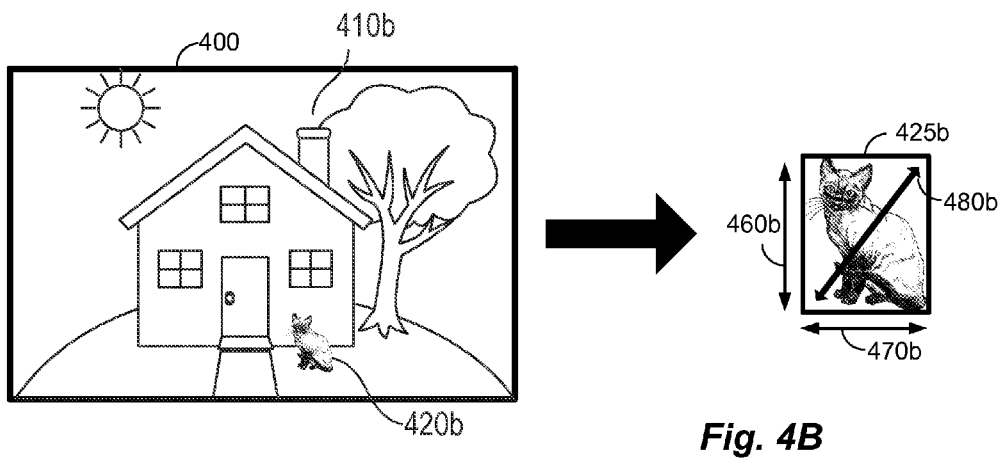
Figure 4C:
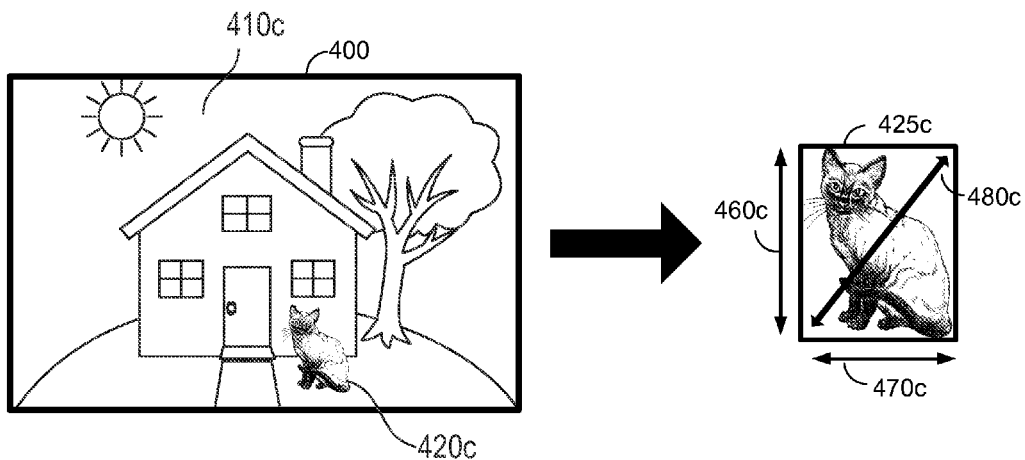

FIGS. 4A-4C illustrate a change in at least one reference parameter of a selected object. An embodiment is shown of a device having a viewing window 400 displaying a scene through multiple captured images (or frames) 410a (FIG. 4A), 410b (FIG. 4B), and 410c (FIG. 4C) each having dimensions 430, 440, and 450. In one embodiment, the dimensions 430, 440, and 450 represent the y-dimension, x-dimension, and diagonal dimension, respectively, of the displayed scene. In another embodiment, the dimensions 430, 440, and 450 are substantially the same between each of the multiple images 410a, 410b, and 410c. The viewing window 400 may be on a display 380 or from a device such as imaging device 300 of FIG. 3, including a video camera, mobile phone, tablet, computer, etc. In some embodiments, viewing window 400 may show images captured or recorded by the imaging device.

The viewing window depicts, captures and/or records a first scene 410b having a selected object 420b, which may be referred to as a reference object. In the illustrative example of FIG. 4B, the object of interest is depicted as a cat. The object of interest may be any number of items that can be imaged in a scene or imaging device. The object of interest 420b may be manually selected by the user, for instance, by touching the location of the object on the screen of a touch screen device. The object may also be automatically selected. For instance, object recognition features such those disclosed in U.S. Patent Application Pub. No. 2013/0335575, the entire contents of which are herein incorporated in their entirety and which discloses features for detecting objects on the fly by using the edges of the object, U.S. Pat. No. 8,254,699, the entire contents of which are herein incorporated in their entirety and which discloses an object recognition algorithm for videos, U.S. Pat. No. 8,064,685, the entire contents of which are herein incorporated in their entirety and which discloses features for 3D object recognition, may be used. In some embodiments, selection of the object of interest 420b may be verified. For example, the imaging device may ask for verification of the selection of the object of interest 420b. In some embodiments, the object of interest 420b may be selected remotely. For instance, the viewing window 400 may show a scene that is viewed over an internet connection, such as a scene viewed by a security camera that is transmitted to the display 380 of FIG. 3. The object of interest 420b could then be selected, for example, by touching the area of a touchscreen on a mobile phone display where the object of interest 420b is located.

The imaging device may be configured to track an object 420b as it changes in successive image frames, e.g., from 410b to 410a or 410b to 410c. As shown, the object 420b may be tracked as it changes and/or moves between the successive images 410a, 410b, and 410c, respectively. In some embodiments, a second object (not shown) may also be tracked, as described above.

In one aspect, the imaging device may determine a region of interest (ROI), such as a bounded rectangle 425a-425c, for each depiction of the object of interest 420a-420c in the multiple images 410a-410c. In one embodiment, the ROI may be displayed in viewing window 400 and viewable by the user. In another embodiment, the ROI is only recorded in the working memory 370 or storage 375 of FIG. 3 as a reference. The bounded rectangles 425a-425c each includes an x-dimension (470a-470c), a y-dimension (460a-460c), and a diagonal dimension (480a-480c). As described above, the imaging device can be configured to extract a focus direction of an autofocus search operation based on a change in a reference parameter derived from the difference between a reference parameter related to a first object 420b and a reference parameter related to a second object, e.g., 420a or 420c. In one embodiment, the reference parameter is based on at least one of the x-dimension, y-dimension, or diagonal dimension of the bounded box. In another embodiment, the reference parameter is based on a calculation of area of the object of interest itself. In yet another embodiment, the reference parameter is based on a pixel count of the ROI or the object of interest.

In one aspect, the imaging device is configured to determine a change in the reference parameter based on the changes in the object 420b between the multiple images 410a-410c. In one embodiment with reference to FIG. 3, the change determination module 345 includes instruction that configure the processor 305 to determine a change in the reference parameter based, at least in part, on changes in the object 420a-420c through the multiple image frames 410a-410c. For example, the object 420b of a first image frame 410b may be a reference object 420b having a reference parameter of the first image. In one embodiment, the image 410b may change or move to image 410a such that object 420b becomes object 420a having a reference parameter of the second image. The object 420a appears to be smaller, relative to the viewing window 400, as compared to reference object 420b. Similarly, the reference parameter corresponding to object 420a will be smaller than the reference parameter corresponding to reference object 420b. Thus, the decrease between the reference parameter of first image 410b and second image 410a represent a change in the reference parameter that is indicative of the object moving farther away from the imaging device. Alternatively, the first image 410b may change to second image 410c such that object 420b becomes object 420c having a change in the reference parameter between the first image 410b and second image 410c. The object 420c now appears to be larger than the reference object 420b. Thus, the difference in the reference parameter represents a change in the reference parameter indicative of the object moving closer to the imaging device.

In some embodiments, a change in the reference parameter may be represented by a change in the at least one of the x-dimension, y-dimension, or diagonal dimension of bounded rectangles 425a-425c illustrated in FIGS. 4A, 4B and 4C, respectively. For example, image 410b may represent a first image having an object 420b represented by bounded rectangle 425b having at least an x-dimension 470b. In this case, the reference parameter may be represented by dimension 470b of the first or reference image 420b. The dimension 470b may be an absolute value, e.g., a pixel count, or may be a relative value to the overall dimension 440 of the viewing window 400. A second, or multiple, images may be captured resulting in image 410a having object 420a and dimension 470a representing the reference parameter of a second image 410a. The dimension 470a may again be an absolute value, e.g., pixel count, or may be a relative value to the overall dimension 440 of the viewing window 400. Viewing window dimension 440 may not change between images 410b and 410a. However, the change in dimension 470b to 470a may represent a decrease in the reference parameter. Alternatively, the subsequent image may be image 410c thereby representing an increase in the dimension 470b to 470c. In this way, the imaging device may determine a change in a reference parameter between multiple images of a tracked object of interest.

Figure 5:
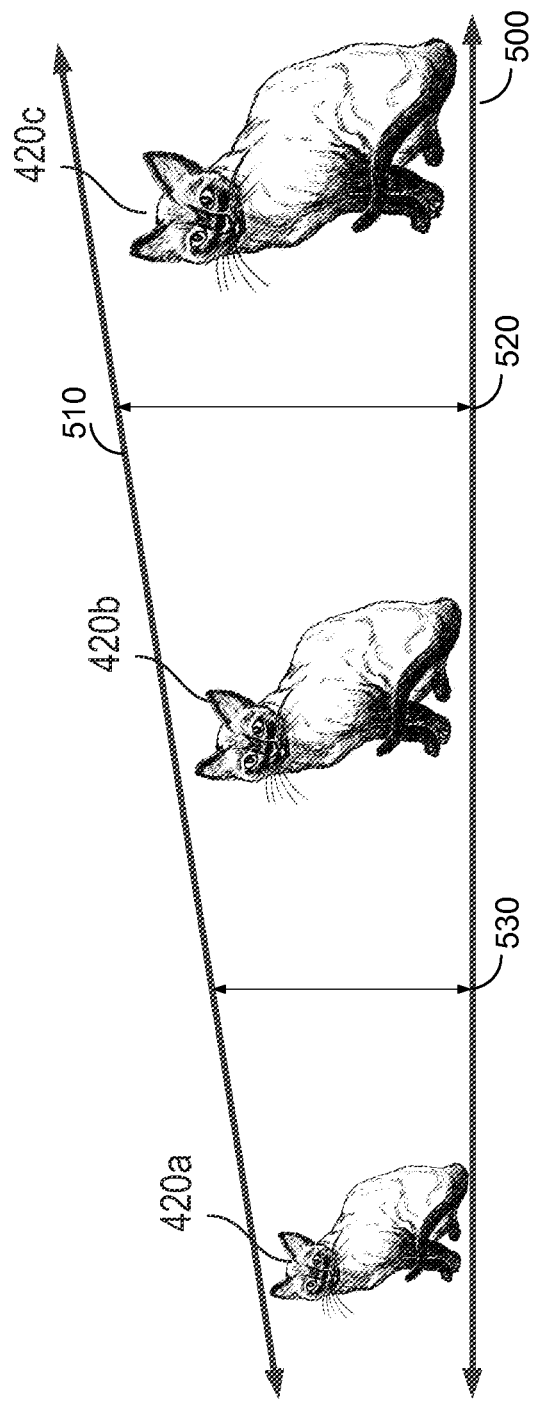
FIG. 5 illustrates a determination of a focus direction based on a reference parameter in accordance with one embodiment.

FIG. 5 illustrates an example of a determination of a focus direction based on a change in the reference parameter in accordance with one embodiment. The lines 500 and 510 are indicative of the change in the reference parameter over continuous successively captured image frames. For example, FIG. 5 depicts objects 420a-420c of FIG. 4, where object 420b illustrates a first captured image of the object 420b which may be considered a reference object 420b. Reference object 420b may have a corresponding reference parameter as described above in reference to FIG. 4B. The reference parameter may be a size or height indicated as the distance between the sloped line 510 and base line 500. As the reference parameter of the object changes (e.g., increases or decreases) from object 420b to 420c or 420b to 420a, the reference parameter changes is illustrated by the enlargement or narrowing, respectively, of the gap between lines 510 and 500. In one embodiment, the aspects of FIG. 5 may be performed by imaging device 300, for example in the object tracking module 340 and change determination module 345 of FIG. 3.

FIG. 5 also depicts exemplary object 420a that represents an instance where the reference parameter of object 420b decreases, shown as object 420b getting smaller. A second exemplary object 420c represents an instance where the reference parameter of object 420b increases, shown as object 420b getting larger. In this way, the imaging device may be configured to monitor the reference parameter via the object tracking module 340, and the imaging device may be able to determine if the object is getting bigger or smaller.

The change in the reference parameter derived in FIG. 5 may be linearly mapped to a relative physical distance that the object is located from the imaging device. For example, the reference parameter change indicator determination module 355 of FIG. 3 may include instructions to indicate that the object is moving closer to the imaging device when the reference parameter increases of the second image frame increases relative to the reference parameter of the first image frame, e.g., the size of the object increases between image frames. Alternatively, the reference parameter change indicator determination module 355 of FIG. 3 may include instructions to indicate that the object of interest is moving farther way from the imaging device when the reference parameter of the current or second image frame decreases relative to the reference parameter of the first image frame, e.g., the size of the object decreases between frames. Based on the mapping of the relative distance to the reference parameter of the current or second image frame, the imaging device may make a focus direction decision to move the lens in the direction of the optimal lens position. The optimal lens position direction decision may be to move the lens, from a starting position, toward the object when the direction of the object is indicated as farther away. In another implementation the lens position focus direction decision may be to move the lens, from a starting position, away from the object when the direction of the object is indicated as getting closer.

In the illustrative embodiment shown in FIG. 5, the focus direction determination may also be based, in part, on a threshold, seen as threshold boundaries 530 and 520. The imaging device may have thresholds by which the imaging device will determine if the object is moving closer or further away based on the overall change trend of the reference parameter. In one embodiment, imaging device 300 may perform the aspects of FIG. 5, for example in the threshold determination module 350, change determination module 345, and/or autofocus control module 360 of FIG. 3.

In the illustrative embodiment of FIG. 5, the threshold includes a first boundary value 520 and a second boundary value 530. In one embodiment, the first and second boundary values may be considered an upper and lower boundary value. In one embodiment, the autofocus control module 360 of FIG. 3 may include instructions to determine a focus direction based on the change in the reference parameters only when the change in the reference parameters is outside of the first and second boundary values 520 and 530. For example, the second boundary value 530 may represent a percentage change between the reference parameter of the first and second image frames. Where the object 420b, and corresponding reference parameter, decreases in size to object 420a, and corresponding reference parameter, the imaging device 300 (FIG. 3) determines the change in the reference parameter is indicative of a decrease only if the decrease from object 420b to 420a is below the threshold value 530. Then the reference parameter change indicator determination module 355 of FIG. 3 may indicate a focus direction based on the decrease between the reference parameter of the first and second image frames. Alternatively, when the difference between the reference parameter of the first and second image frames increases beyond the first boundary value 520 to object 420c, then a focus direction may be based on the increase between the reference parameter of object of interest 420b and 420c. In an illustrative embodiment, the threshold value defines the first and second boundaries from which the focus direction may be derived.

As seen in FIG. 5, focus direction determination may be made once a change in the reference parameter relative to reference parameter the last saved or first image frame reaches a threshold value, which may have an upper or lower boundary value. The threshold may provide a first boundary value 530 and a second boundary value 520 for the imaging device 300 to determine the focus direction. For example, the reference size of an object in a first image frame, e.g., object 420b, may be set to a value of 1 and a threshold value, based on the objects distance from the imaging device, of 0.15. The first boundary may be determined as 1 times 1.15 and the second boundary may be 1 divided by 1.15. Only changes in the reference parameter of the first and second frame having an average change or change trend of the reference parameter of 1.15 times the reference parameter of the first image frame or 1/1.15 times the reference parameter of the first image frame may result in a direction determination. In another embodiment, for each focus operation the reference parameter of the first image frame may be updated or saved in working memory 370 and/or storage 375 of FIG. 3, and the updated reference parameter may be set to 1 for the next focus operation.

Figure 6:
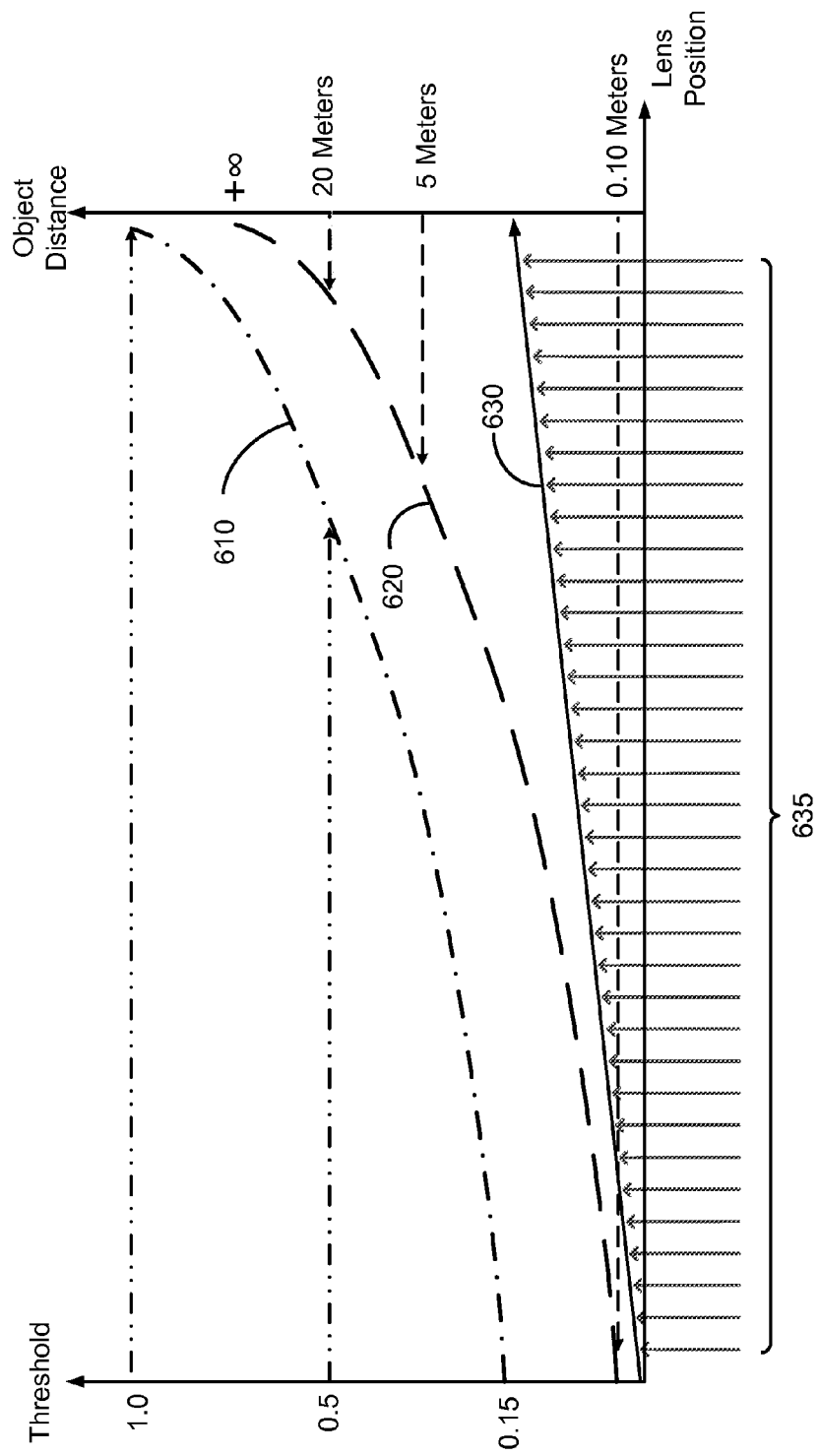
FIG. 6 is a graph illustrating the dynamic threshold of the direction decision in accordance with one embodiment.

FIG. 6 is a graph illustrating a dynamic threshold of the focus direction determination. FIG. 6 depicts a graph of the threshold value, represented by line 610, based on the physical distance of the object, represented by line 620, and the actuator positions 635, represented in FIG. 6 as arrows. The physical distance of an object can be determined based on the actuator position. For example, the actuator can only move to set discrete actuator positions 635 based on the design and manufacture of the actuator in the imaging device. At the end of an autofocus search operation, the actuator will be located at one of the actuator positions 635 which correlates to a physical distance of the object (e.g., curve 620). The threshold for a given distance, based on the actuator position, may be determined from curve 610. Thus, after the completion of an autofocus search operation, the previous threshold value is saved based on the position of the actuator for that operation. The aspects of FIG. 6 may be performed by imaging device 300, for example in object tracking module 340, change determination module 345, and threshold determination module 350, as described in reference to FIG. 3.

In one aspect, the direction determination may include a threshold value in which the determination of the focus direction will only be made once exceeded, as detailed above in reference to FIG. 5. However, as depicted in FIG. 6, the direction determination for a faraway object may need to be less sensitive than the determination need be when the object is close. For example, there may be no direction decision needed when the object is further than 5 or 6 meters because the actuator, and thus the lens, will be positioned at an infinite focus position. Thus, as shown in FIG. 6, the direction determination threshold value may increase with an increase in physical distance. The threshold value may depend on the actual camera lens and image sensor, and may need to be tuned based on the overall imaging device 300.

FIG. 7 is a flowchart of a process of determining the focus direction in accordance with one embodiment. Process 700 may be performed by imaging device 300, illustrated in FIG. 3. In some embodiments, the method of determining a focus direction for an autofocus search operation may be performed by the lens control module 325 in communication with any one of the modules of memory 320. The method can be implemented as a software solution by the memory 320 or implemented elsewhere in the imaging device 300, for example one or more processors executed by a logic device in processor 305.

Process 700 begins at a start block and then moves to process block 710, where the imaging device starts an autofocus search operation and object tracking. In one embodiment, an autofocus search operation is started by the user of the imaging device framing a scene for eventual capturing of an image of at least one object of interest. In another embodiment, the autofocus search operation is started when the user operates an input device to initiate the taking of a photograph or recording a scene. In this embodiment, the autofocus search operation may occur directly after the user operates the input device but before the imaging device records the photograph in the imaging device storage. The sub-process of process block 710 will be explained in further detail below with reference to FIG. 8.

After the autofocus search operation is commenced, the process 700 moves to block 720, where the current reference parameter is determined based, at least in part, on the tracking results of the current image frame. The reference parameter of the current frame may also be referred to as a reference parameter of the second frame, and each successive frame may have a corresponding reference parameter. In some embodiments, the reference parameter may be based on the relative size of the object of interest, where the object size is relative to the dimensions of the display. In another embodiment, the reference parameter may be based on the at least one dimension of a bounded rectangle encapsulating the object of interest, such as an x-, y- or diagonal dimension of the bounded rectangle. In one embodiment, as described in greater detail in reference to FIG. 3, the processor 305 is configured by reference parameter determination module 335 to accept a reference parameter based, at least in part, on the tracking operation of a user selected object of interest. The reference parameter may be determined based on the size of an object and/or a ROI as explained more fully herein. In one embodiment, the reference parameter is based on, at least one of, an x-dimension, y-dimension, or diagonal dimension of a determined bounded rectangle. Instructions included in the reference parameter determination module 335 may configure the processor 305 to record the threshold value in the working memory 370 or storage 375, as illustrated in FIG. 3.

After the current reference parameter is determined, the process 700 continues to block 730, where the last saved reference parameter of the last image frame for an autofocus search operation and the threshold are retrieved. In one embodiment with reference to FIG. 3, the processor 305 is configured to access working memory 370 and/or storage 375 to retrieve the last saved reference parameter. In one embodiment, the last saved reference parameter can be determined by instructions in the reference parameter determination module 335 based on a the last reference parameter determined in a previous autofocus search operation, as described in more detail in reference to block 790. In one embodiment, in the first instance, the process 700 accepts the current reference parameter of the first frame as the last saved reference parameter. In some embodiments, the last saved reference parameter may also be considered the reference parameter of the first image frame or a referential reference parameter, that may be used as a basis for determining whether a change in the reference parameter has occurred in subsequently captured image frames. For example, by comparing the last saved reference parameter with a reference parameter of the current or a second image frame, as will be described in more detail in reference to block 750, a change in the reference parameter may be determined between a prior autofocus operation and a current or second image frame.

Further, process 700 may determine the threshold at block 730. In one embodiment, the threshold is based on the physical distance of the object from the imaging device, derived at least in part based on the reference parameter of the object as described in reference to FIGS. 5 and 6. In one embodiment, the threshold may be based on a current actuator position. In another embodiment, the threshold may be based on the current actuator position as a result of a previous autofocus search operation. In yet another embodiment in reference to FIG. 3, the threshold determination module 350 may determine a threshold value having a first and second boundary value, based on the tracking information obtained from the object tracking module 340. Instructions included in the threshold determination module 350 may configure the processor 305 to record the threshold value in the working memory 370 or storage 375.

Process 700 then moves to block 740, where reference parameter of the current image frame of the object is filtered and monitored. Each determination of a reference parameter for each frame may be less dependable, thus process 700 may determine a set of reference parameter changes, e.g., a trend in the reference parameter changes, to smooth or extract outliers or extraneous reference parameters that may occur while the object is tracked. For example, a change in the reference parameter between a last saved and first current image frame may indicate a decrease in the reference parameter (e.g., the object is moving away), but a change in the reference parameter between the last saved and a second current frame may indicate an increase (e.g., the object is getting closer) that may be due to a sudden movement of the imaging device. In this case, the imaging device may monitor and filter the set of reference parameter changes, the set including comparisons of the last saved reference parameter and a reference parameter for each frame, to minimize or remove the effect of the extraneous reference parameter change. In this way, a trend of reference parameter changes may be determined, that may indicate a general or overall direction of object movement. In one embodiment, the reference parameter change indicator determination module 355 may include instructions to configure the processor 305 to determine a trend in the reference parameter changes, as illustrated in FIG. 3. In another embodiment, block 740 includes instructions to apply smoothing filters, thereby determining a relative average change of the reference parameter across the multiple images. For example, a median filter may be applied to the set of reference parameter changes to output a dependable change trend. In one implementation, a median filter may be a filter able to perform noise reduction on an image or signal, where the signal of one entry corresponding to a single frame is replaced with the median of neighboring entries. In one implementation, a one dimensional median filter having a length of 5 may be used on the width of the tracking information to prevent noise, such that the median filter may replace the instant entry with the median of the five neighboring entries. In some embodiments, the neighboring entries include the entries preceding the instant entry. In other embodiments, the neighboring entries include the entries following the instant entry. In yet other embodiments, the neighboring entries include entries that both follow and precede the instant entry. In this way, the change trend may indicate the average or general direction of movement of the object.

Process 700 may then move to block 750, where the process 700 determines a change in the reference parameter based at least in part on a comparison of the reference parameter of the current frame and reference parameter of a last saved or first image frame (e.g., the last saved reference parameter from a previous focus operation or the reference parameter corresponding to a first frame). In one embodiment, the reference parameter of the first image frame is compared with each reference parameter of successively captured frames, via the object tracking module 340, and analyzed by the processor 305 configured based on instructions from the change determination module 345, as illustrated in FIG. 3. In one embodiment, the change in the reference parameter may be determined as detailed in reference to FIGS. 4A-4C. For example in reference to FIG. 3, an object of a first image, having a first reference parameter, is compared to the object of the currently tracked frame having a current reference parameter, and the change is recorded by the processor 305 based on instructions form the change determination module 345. In another embodiment, the change between the reference parameter of a first image and the reference parameter of successively tracked frames may be recorded to generate a set of reference parameter changes, as described above.

Process 700 then moves to decision block 760, where process 700 determines whether the change in the reference parameter, as determined in block 750, has reached a condition relative to the threshold value. The determination of decision block 760 may be made in the threshold determination module 350 and/or autofocus control module 360 as illustrated in FIG. 3. In one embodiment, the threshold value includes a first and second boundary value, whereby the change in the reference parameter must be greater than the first boundary value or less than the second boundary value, as detailed above in reference to FIGS. 5 and 6. If the change in the reference parameter has not reached a condition relative to the threshold value, then process 700 returns to block 720 and repeats process 700 until the change in the reference parameters is either above or below the threshold value. If the change in the reference parameter change has reached the condition relative to the threshold value, process 700 may move to process block 770.

At block 770, process 700 records the reference parameter change indicator. In one embodiment with reference to FIG. 3, reference parameter change indicator determination module 355 includes instructions to configure processor 305 to record the reference parameter change indicator in working memory 370 and/or storage 375. In another embodiment with reference to FIG. 3, reference parameter change indicator determination module 355 includes instructions to configure processor 305 to transmit the reference parameter change indicator to the autofocus control module 360. In this way, the autofocus control module 360 of FIG. 3 may utilize the reference parameter change indicator in performing an autofocus search operation, as described below in reference to FIG. 9.

After the reference parameter change indicator is recorded, process 700 may then move to decision block 780. At decision block 780, process 700 may determine whether the autofocus search operation has finished. If the autofocus search operation is not complete, then process may return to block 720 and repeat the process to determine a proper focus direction. If the imaging device determines the autofocus search operation is complete, then process 700 moves to block 790. At block 790, process 700 updates the reference parameter to be the last saved reference parameter and updates the threshold values. The reference parameter of the first image frame may be updated based on the last saved reference parameter corresponding to the last saved image frame, where the last saved reference parameter is the reference parameter corresponding to the last frame of previous autofocus search operation. The threshold may be updated based on a current lens or actuator position due to the previous autofocus search operation. In some embodiments, the last saved reference parameter and threshold are updated after every focus operation. The updating of the last saved reference parameter and threshold values may be performed at the same stage, as illustrated in block 790 of FIG. 7. However, the operations are separate and independent. In one embodiment with reference to FIG. 3, processor 305 is configured to record the last reference parameter of the object determined by the reference parameter determination module 335 as the last saved reference parameter in working memory 370 and/or storage 375. In another embodiment with reference to FIG. 3, the processor 305 is configured to record the threshold based at least in part on the position of the lens as a result of the autofocus search operation. Once the reference parameter and threshold values are updated, the process moves to block 730 to be repeated for a subsequent autofocus operation.

Figure 8:
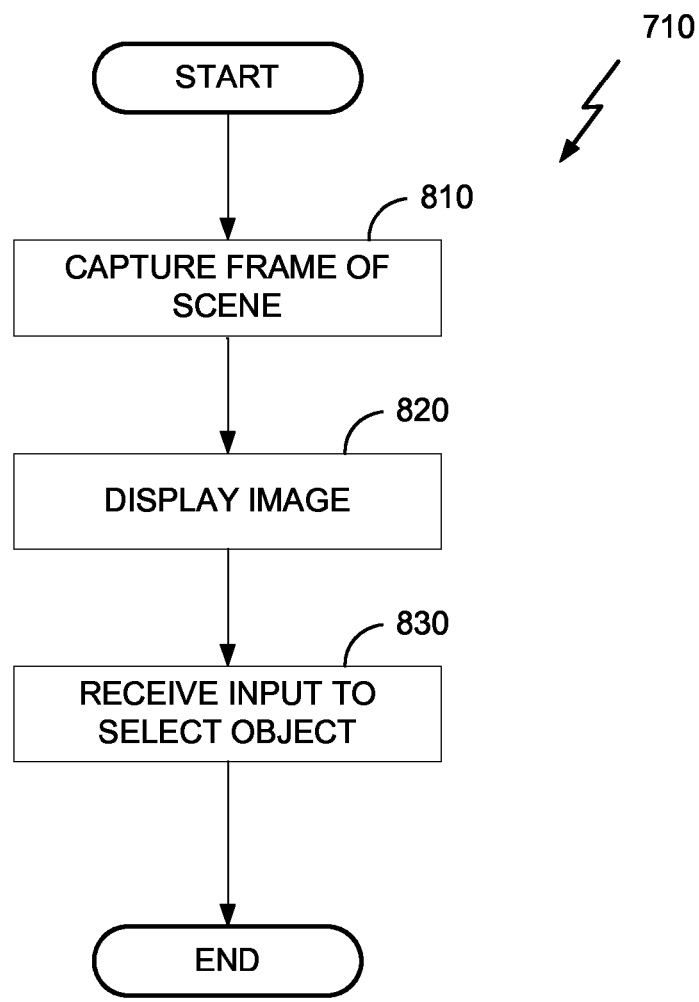
FIG. 8 is a flowchart of a process of initializing object tracking in accordance with one embodiment.

FIG. 8 is a flowchart of a sub-process that can be performed at process block 710 of FIG. 7 for initializing the tracking of an object. In one embodiment with reference to FIG. 3, object tracking is performed by the processor 305 configured by instructions from object tracking module 340 and/or input processing module 330. The sub-process beings at a start block and then proceeds to block 810, where an image frame is captured by the imaging device. The image may be a photograph, still or video captured by the imaging device. In an illustrative embodiment, light from an image or scene enters lens 310 and is focused on the image sensor 314 of FIG. 3, thereby capturing the image. The image may include one or several objects of interest that may be moving or stationary.

The sub-process shown in FIG. 8 of process block 710 of FIG. 7 then moves to block 820, wherein the image may be displayed. For example, the image may be displayed on the display of the imaging device, such as display 380 of imaging device 300 of FIG. 3. The image may be recorded or currently recording, e.g., taped or live. Further, a captured image may be from the same device displaying the image, or it may be from a different device.

The sub-process of process block 710 then moves to block 830, wherein an input selecting an object of interest is received. In some embodiments, the selection of the object may be received by a user touching a screen or display where the object is currently located on the display. In other embodiments, the object is selected by the imaging device or a portion thereof based on instructions included in the memory, such as memory 320 of FIG. 3. In other embodiments, the selection of the object may also be received by receiving information identifying the object. For example, a description of the object may be stored in the device. In some embodiments, selecting an object includes creating a region of interest (ROI) that includes the object. For example, an ROI may be formed around the object, indicating that the object in the region has been selected. In some embodiments, the region may not be visible. In one embodiment, the processor 305 may be configured to receive a user selected object of interest based on instructions from the input processing module 330 and user interaction with input device 390, as illustrated in FIG. 3.

After the user or imaging device selects the object of interest, the sub-process of process block 710 continues to an end block. The sub-process of process block 710, once completed, may return to process 700 and continue to block 720 as described above in reference to FIG. 7.

Figure 9:
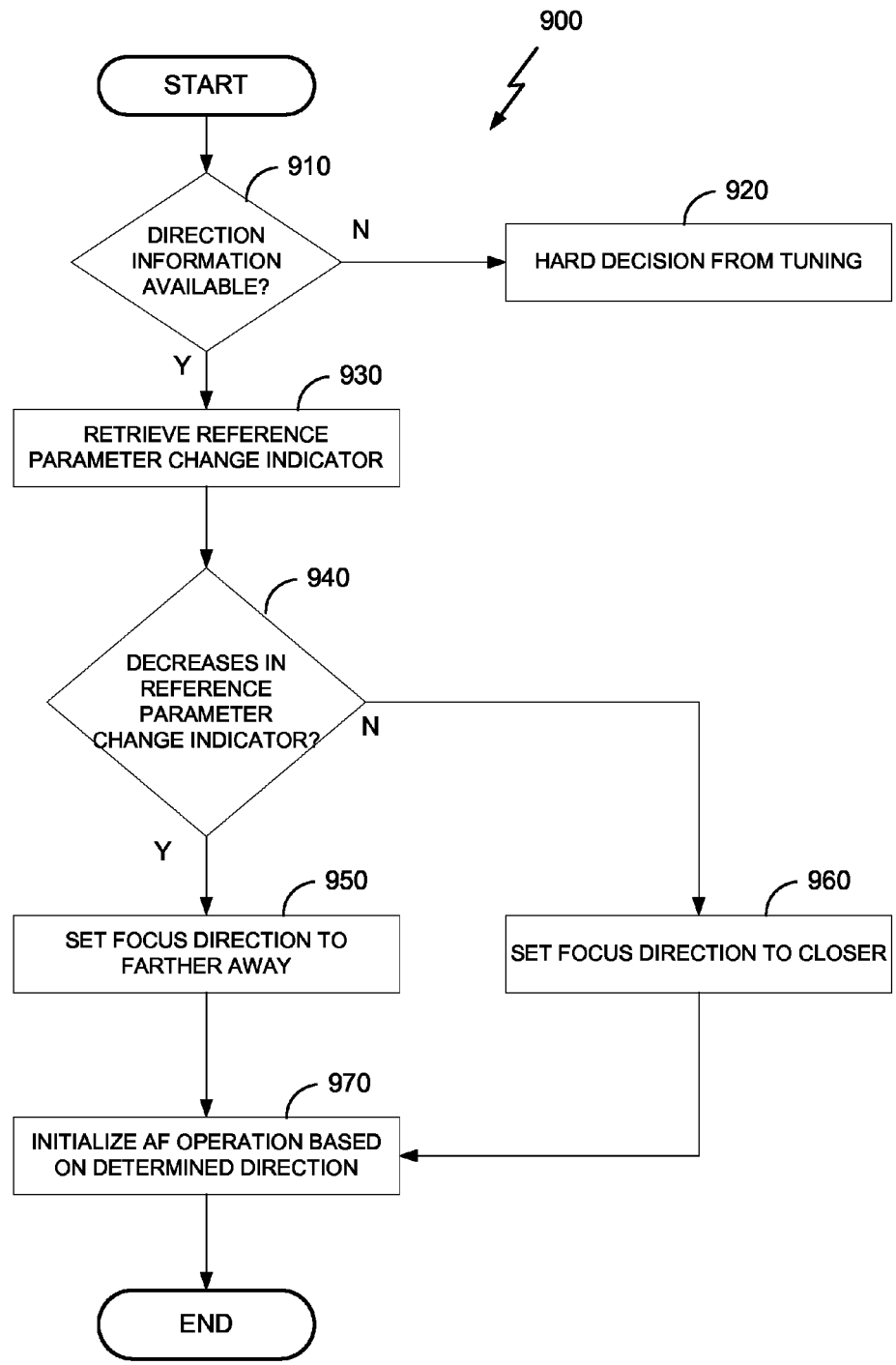
FIG. 9 is a flowchart of a process of initializing an autofocus search operation in accordance with one embodiment.

FIG. 9 is a flowchart of a process 900 of utilizing the direction determination in an autofocus search operation in accordance with one embodiment. Process 900 may be performed by imaging device 300, illustrated in FIG. 3, for example. In one embodiment, process 900 may be performed by the lens control module 325 and/or autofocus control module 360 in communication with any one of the modules of memory 320, as illustrated in FIG. 3. The method can be implemented as a software solution by the memory 320 or implemented elsewhere in the imaging device 300, for example one or more processors executed by a logic device in processor 305 of FIG. 3.

Process 900 begins at the start of an autofocus search operation and proceeds to decision block 910. At decision block 910, a determination is made as to whether direction information is available. In one embodiment with reference to FIG. 3, the determination may be made by the processor 305 having been updated by change determination module 345, threshold determination module 350, and/or reference parameter change indicator determination module 355. If the determination is not made at decision block 910, that direction information is not available, then process moves to block 920. At block 920, process 900 may initiate an autofocus search operation based on traditional methods discussed above.

If the determination is made at decision block 910, that direction information is available, then process 900 moves to block 930. At block 930, the reference parameter change indicator is retrieved based on tracking results as described in reference to FIG. 7. In one embodiment, the reference parameter change indicator is based, at least in part, on the trend in the reference parameter changes and/or the threshold value. In one embodiment, instructions in reference parameter change indicator determination module 355 includes instructions to configure processor 305 to retrieve the reference parameter change indicator from working memory 370 and/or storage 375, as illustrated in FIG. 3.

Once process 900 retrieves the reference parameter change indicator, process 900 continues to decision block 940. At decision block 940, a determination is made as to whether the reference parameter change indicator indicates a decrease in the reference parameter. In the illustrative embodiment of FIG. 9, if the determination is made that the reference parameter change indicator indicates a decrease in reference parameter, then the process 900 continues to block 950. At block 950, the focus direction for the focus operation is set to farther away. In some embodiments, the determination that the reference parameter change indicator is decreasing indicates that the difference between the reference parameter of the first image frame or the last saved image frame and the reference parameter for each frame following the first frame has decreased, on average, across the multiple frames. In one embodiment, a decrease in the difference between the reference parameters may indicate that the selected size of the object has decreased, thereby indicating that the object is moving further away from the imaging device relative to the reference parameter of the first image frame or last saved image frame.

Alternatively, if the determination is made that the reference parameter change indicator indicates an increase in difference between the reference parameter of the first or the last saved image frame and the reference parameter corresponding to each subsequent frame, then the process 900 moves to block 960. At block 960 the focus direction for the autofocus search operation is set to closer. In one embodiment, an increase in the difference between reference parameters may indicate that the size of the object has increased, thereby indicating that the selected object is moving closer to the imaging device relative to the reference parameter of the first or last saved image frame.

The process 900 then moves to block 970, where the autofocus search operation is started based on the determined direction. In one embodiment, the autofocus control module 360 of FIG. 3 may initiate an autofocus search operation by causing actuator 312 to move lens 310 based on the determination in block 960. In one embodiment, autofocus control module 360 includes instructions to configure processor 305 to determine the focus direction based on the reference parameter change indicator. In this way, process 900 is capable of commencing an autofocus search operation by moving the lens in the proper focus direction at the outset of the autofocus search operation, thereby quickly and efficiently moving the lens toward the optimal focus position.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments or aspects of the embodiments. A person of ordinary skill in the art will appreciate that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the embodiments of the innovations disclosed herein. Various modifications to these implementations will be readily apparent to those skilled in the art, and the generic principles defined herein may be applied to other implementations without departing from the spirit or scope of the disclosure. Thus, the presently described embodiments are not intended to be limited to the implementations shown herein but is to be accorded the widest scope consistent with the principles and novel features disclosed herein.

What is claimed is:

1. A method of determining a direction of focusing an imaging device, comprising:
capturing a plurality of frames depicting a scene with an imaging device, the plurality of frames captured by the imaging device at a first lens position;
determining a portion of at least one frame that corresponds to an object;
tracking the object in the plurality of frames, wherein tracking the object provides a reference parameter of the object for each of the plurality of frames;

generating a plurality of differences between the reference parameter of a first frame and reference parameters for each frame captured after the first frame;

averaging the plurality of differences;

determining a focus direction based on the average; and initiating a focus operation by moving the lens of the imaging device from the first lens position to a second lens position based on the determined focus direction.

2. The method of claim 1, wherein said determining further comprises:

displaying at least one frame of the plurality of frames; and receiving a user input to select a portion of the displayed frame that corresponds to the object.

3. The method of claim 1, wherein the reference parameter corresponds to the size of the object relative to a frame in which it is depicted.

4. The method of claim 3, wherein said tracking the object further comprises:

detecting a size of the object in the first frame; and detecting a size of the object in each frame captured after the first frame.

5. The method of claim 1, further comprising determining a bounding rectangle that surrounds the object for each depiction of the object in the plurality of frames, wherein the reference parameter for each frame is based on a dimension of the bounding rectangle.

6. The method of claim 5, wherein the reference parameter for each frame is based on one of an x-dimension of the bounding box, a y-dimension of the bounding rectangle, or a diagonal of the bounding rectangle.

7. The method of claim 1, after completion of a prior focus operation, further comprising:

identifying a last frame of the plurality of frames from the prior focus operation;

determining a reference parameter of the last frame from the prior focus operation; and setting the reference parameter of the first frame for a current focus operation to be the reference parameter of the last frame from the prior focus operation.

8. The method of claim 1, further comprising:

smoothing the plurality of differences; and generating a reference parameter change indicator indicative of the smoothed plurality of differences.

9. The method of claim 8, wherein the reference parameter change indicator indicates the object is getting closer to the imaging device when the average increases relative to the reference parameter of the first frame.

10. The method of claim 8, wherein the reference parameter change indicator indicates the object is getting farther away from the imaging device when the average decreases relative to the reference parameter of the first frame.

11. The method of claim 1, wherein determining the focus direction further comprises:

determining a threshold change to the reference parameter, having a first boundary value and second boundary value;

comparing the average with the first boundary value and second boundary value; and determining the focus direction only when the average is greater than the first boundary value of the threshold or less than the second boundary value of the threshold.

12. The method of claim 11, wherein the first and second boundary values correspond to the position of the object relative to the imaging device.

13. The method of claim 11, wherein the first and second boundary values are dynamic and configured to be adjusted for separate focusing operations.

14. The method of claim 11, wherein the focus direction is determined to be closer when the average increases relative to the reference parameter of the first frame and the average is greater than the first boundary value of the threshold.

15. The method of claim 11, wherein the focus direction is determined to be further away when the average decreases relative to the reference parameter of the first frame and the average is less than the second boundary value of the threshold.

16. The method of claim 11, wherein the first boundary value corresponds to an upper boundary value of the threshold and the second boundary value corresponds to a lower boundary value of the threshold.

17. The method of claim 11, wherein, after completion of a prior focus operation having a last lens position, said determining a threshold change to the reference parameter further comprises:

identifying the last lens position of the prior focus operation, the last lens position indicative of a distance between the imaging device and the object;

retrieving a threshold associated with the distance between the imaging device and the object, wherein the threshold is one of a plurality of thresholds each associated with a distance of a plurality of distances between the imaging device and the object; and setting the threshold change to the reference parameter of the current focus operation to the retrieved threshold.

18. An apparatus for determining a direction of focusing an imaging device, comprising:

a lens;

an image sensor, configured to capture a plurality of frames depicting a scene, the plurality of frames captured by the imaging device at a first lens position;

a memory circuit storing focusing instructions;

at least one processor, operably coupled to the image sensor, lens, and the memory circuit, and configured by the instructions to at least:

determine a portion of at least one frame that corresponds to an object;

track the object in the plurality of frames;

determine a reference parameter of the object for each of the plurality of frames based on the tracking of the plurality of frames;

generate a plurality of differences between the reference parameter of a first frame and reference parameters for each frame captured after the first frame;

average the plurality of differences; and determine a focus direction based on the average and initiate a focus operation by moving the lens from the first lens position to a second lens position based on the focus direction.

19. The apparatus of claim 18, wherein the at least one processor is configured to determine a region of interest that surrounds the object for each depiction of the object in the plurality of frames, wherein reference parameter for each frame is based on at least one dimension of the region of interest.

20. The apparatus of claim 18, wherein, after completion of a prior focus operation, the at least one processor is further configured to:

identify a last frame of the plurality of frames from the prior operation;

determine a reference parameter of the last frame from the prior focus operation; and set the reference parameter of the first frame for a current focus operation to be the reference parameter of the last frame from the prior focus operation.

21. The apparatus of claim 18, wherein the at least one processor is configured to:
smooth the plurality of differences, and
generate a parameter change indicator indicative of the smoothed plurality of differences.

22. The apparatus of claim 21, wherein parameter change indicator indicates that the object is getting closer to the imaging device when the average increases relative to the reference parameter of the first frame.

23. The apparatus of claim 21, wherein parameter change indicator indicates that the object is getting farther away from the imaging device when the average decreases relative to the reference parameter of the first frame.

24. The apparatus of claim 18, wherein the at least one processor is configured to determine a threshold change to the reference parameter having first and second boundary values based on the position of the object relative to the imaging device, and configured to compare average with the first boundary value and second boundary value.

25. The apparatus of claim 24, wherein the at least one processor is configured to determine the focus direction only when the average is greater than the first boundary value or less than the second boundary value.

26. The method of claim 24, wherein the memory circuit stores an association of a plurality of thresholds with a plurality of distances between the imaging device and the object, and wherein, after completion of a prior focus operation at a last lens position, the at least one processor is configured to:
identify the last lens position of the prior focus operation, the last lens position indicative of a distance between the imaging device and the object;
retrieve, from the memory circuit, a threshold associated with the distance between the imaging device and the object; and
set the threshold change to the reference parameter of the current focus operation to the retrieved threshold.

27. An apparatus for determining a direction of focusing an imaging device, comprising:
a means for capturing a plurality of frames depicting a scene at a first lens position;
a means for determining a portion of at least one frame that corresponds to an object;
a means for tracking the object in the plurality of frames;
a means for determining a reference parameter of the object for each of the plurality of frames based on the tracking of the plurality of frames;
a means for detecting a plurality of differences between at the reference parameter of a first frame and the reference parameters for each frame captured after the first frame;
a means for averaging the plurality of differences;
a means determining a focus direction based on the average; and
a means for initiating a focus operation by moving the means for focusing from a first position to a second position based on the focus direction.

28. A non-transitory computer readable medium comprising instructions that when executed cause a processor to perform a method of initiating a focus operation, the method comprising:
capturing a plurality of frames depicting a scene with an imaging device at a first lens position;
determining a portion of at least one frames that corresponds to an;
tracking the object in the plurality of frames, wherein tracking the object provides a reference parameter of the object for each of the plurality of frames;
generating a plurality of differences between the reference parameter of a first frame and reference parameters for each frame captured after the first frame;
averaging the plurality of differences;
determining a focus direction based on the average; and
initiating a focus operation by moving a lens of the imaging device from the first lens position to a second lens position based on the focus direction.

* * * * *